United States Patent
Paek et al.

(10) Patent No.: US 12,436,404 B2
(45) Date of Patent: Oct. 7, 2025

(54) LENS DRIVING DEVICE AND CAMERA MODULE INCLUDING LENS DRIVING DEVICE

(71) Applicant: Samsung Electro-Mechanics Co., Ltd., Suwon-si (KR)

(72) Inventors: Seungyun Paek, Suwon-si (KR); Kyunghun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 529 days.

(21) Appl. No.: 17/979,334

(22) Filed: Nov. 2, 2022

(65) Prior Publication Data
US 2023/0146805 A1   May 11, 2023

(30) Foreign Application Priority Data

Nov. 8, 2021   (KR) .................. 10-2021-0152472
Nov. 8, 2021   (KR) .................. 10-2021-0152473
Apr. 4, 2022   (KR) .................. 10-2022-0041845

(51) Int. Cl.
   *G02B 27/64*    (2006.01)
   *G02B 7/02*     (2021.01)
   *G03B 5/04*     (2021.01)

(52) U.S. Cl.
   CPC ............. *G02B 27/646* (2013.01); *G03B 5/04* (2013.01); *G02B 7/02* (2013.01); *G03B 2205/0015* (2013.01)

(58) Field of Classification Search
   CPC .......... G02B 27/646; G02B 7/02; G03B 5/04; G03B 2205/0015; G03B 5/00
   See application file for complete search history.

(56) References Cited

U.S. PATENT DOCUMENTS

| | | |
|---|---|---|
| 2010/0165132 A1 | 7/2010 | Tokiwa et al. |
| 2019/0294027 A1* | 9/2019 | Kim .................. G03B 5/00 |
| 2021/0048729 A1 | 2/2021 | Yoon et al. |
| 2021/0223504 A1* | 7/2021 | Hsu .................. G02B 27/646 |

FOREIGN PATENT DOCUMENTS

| | | |
|---|---|---|
| JP | 5039019 B2 | 10/2012 |
| KR | 10-2176824 B1 | 11/2020 |
| KR | 10-2319600 B1 | 11/2021 |

\* cited by examiner

*Primary Examiner* — Cara E Rakowski
(74) *Attorney, Agent, or Firm* — NSIP Law

(57) ABSTRACT

A lens driving device includes a carrier; and an image stabilization unit including a lens holder for a lens barrel, and a support frame having a quadrangular frame structure including four corner regions and supporting the lens holder. The lens holder is disposed in the carrier. The image stabilization unit is configured to move the lens holder in a direction perpendicular to an optical axis direction. The support frame includes a first sub-frame including a connection-type molded portion connecting three corner regions of the quadrangular frame structure, and an island-type molded portion separated from the connection-type molded portion and disposed in a fourth corner region of the quadrangular frame structure, and a second sub-frame made of a material stronger than a material of the first and connecting the four corner regions of the quadrangular frame structure and being combined with the connection-type molded portion and the island-type molded portion.

25 Claims, 8 Drawing Sheets

VIII-VIII'

LENS DRIVING DEVICE AND CAMERA MODULE INCLUDING LENS DRIVING DEVICE

CROSS-REFERENCE TO RELATED APPLICATIONS

This application claims the benefit under 35 USC 119(a) of Korean Patent Application Nos. 10-2021-0152472 filed on Nov. 8, 2021, 10-2021-0152473 filed on Nov. 8, 2021, and 10-2022-0041845 filed on Apr. 4, 2022, in the Korean Intellectual Property Office, the entire disclosures of which are incorporated herein by reference for all purposes.

BACKGROUND

1. Field

The present disclosure relates to a lens driving device and a camera module including a lens driving device.

2. Description of Related Art

As information communication techniques and semiconductor techniques rapidly develop, supply and use of electronic devices are steeply increasing. The electronic devices do not merely perform functions in their own traditional areas of technology, but functions from various areas of technology, and the combined functions.

Camera modules have become standard features in portable electronic devices such as smartphones, tablet PCs, and laptop computers, and an autofocus (AF) function, an image stabilization (IS) function, and a zoom function are typically included in the camera modules provided in the portable electronic devices.

The image stabilization function may include camera shaking correction and hand shaking correction, and it may prevent images of subjects from being blurry when they are photographed when unintentional hand shaking or camera shaking occurs.

The autofocus function allows acquiring of clear images on an imaging plane of an image sensor by moving a lens positioned at the front of the image sensor in the optical axis direction depending on the distance from the subject.

As the electronic devices which the camera module is provided have become thinner, the camera module must also become thinner, and to realize the thinner camera module, the constituent elements of the camera module must also become thinner, and great rigidity is simultaneously needed.

The above information disclosed in this Background section is only for enhancement of understanding of the background of the disclosure, and therefore it may contain information that does not constitute prior art that is already known to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens driving device includes a carrier; and an image stabilization unit including a lens holder configured to hold a lens barrel, and a support frame having a quadrangular frame structure including four corner regions and supporting the lens holder, the support frame and the lens holder being disposed in the carrier, the image stabilization unit being configured to move the lens holder relative to the carrier in a direction perpendicular to an optical axis direction of the lens holder, wherein the support frame includes a first sub-frame including a connection-type molded portion connecting three corner regions of the quadrangular frame structure, and an island-type molded portion separated from the connection-type molded portion and disposed in a fourth corner region of the quadrangular frame structure; and a second sub-frame made of a material having a higher strength than a material of which the first sub-frame is made, the second sub-frame connecting the four corner regions of the quadrangular frame structure and being combined with the connection-type molded portion and the island-type molded portion.

The first sub-frame may be made of a resin material, and the second sub-frame may be made of a metal material.

A minimum thickness of the second sub-frame in the optical axis direction may be smaller than a minimum thickness of the first sub-frame in the optical axis direction.

The connection-type molded portion may include guide grooves in the three corner regions of the quadrangular frame structure, and the island-type molded portion may include guide grooves in the fourth corner region of the quadrangular frame structure.

The guide grooves of the connection-type molded portion and the guide grooves of the island-type molded portion may extend in a same direction.

The second sub-frame may further include a bent post that is bent from the second sub-frame in the optical axis direction in the fourth corner region of the quadrangular frame structure and embedded in the island-type molded portion.

The bent post may include two bent posts facing in two directions that are orthogonal to each other.

The second sub-frame may include a combining hole extending in the optical axis direction in the fourth corner region of the quadrangular frame structure and filled by a material of the island-type molded portion.

The second sub-frame may include a step portion formed by bending the second sub-frame to lower a portion of the second sub-frame in the optical axis direction in a region of the quadrangular frame structure in which the second sub-frame is combined with the connection-type portion.

The step portion may include two steps in the second sub-frame that are disposed parallel to each other in a diagonal direction of the second sub-frame.

The lens holder may be disposed on the support frame, and an image stabilization magnet may be disposed on a portion of an external side of the lens holder corresponding to a space between an end portion of the connection-type molded portion and the island-type molded portion.

A lower end of the image stabilization magnet may be disposed lower than an upper end of a bottom of the connection-type molded portion.

In another general aspect, a camera module includes a housing; a lens barrel in which at least one lens is disposed; a carrier disposed in the housing; a focus unit configured to move the carrier relative to the housing in an optical axis direction of the at least one lens; and an image stabilization unit including a lens holder in which the lens barrel is disposed, and a support frame having a quadrangular frame structure including four corner regions and supporting the lens holder, the support frame, the lens holder, and the lens barrel being disposed in the carrier, the image stabilization unit being configured to move the lens holder and the lens barrel relative to the carrier in a direction perpendicular to the optical axis direction, wherein the support frame includes a first sub-frame including a connection-type molded portion connecting three corner regions of the quadrangular frame structure, and an island-type molded portion separated from the connection-type molded portion and disposed in a fourth corner region of the quadrangular frame structure; and a second sub-frame made of a material having a higher strength than a material of which the first sub-frame is made, the second sub-frame connecting the four corner regions of the quadrangular frame structure, and being combined with the connection-type molded portion and the island-type molded portion.

The first sub-frame may be made of a resin material, and the second sub-frame may be made of a metal material.

The second sub-frame may include a bent post that is bent from the second sub-frame in the optical axis direction in the fourth corner region of the quadrangular frame structure and is embedded in the island-type molded portion.

The second sub-frame may include a step portion formed by bending the second sub-frame to lower a portion of the second sub-frame in the optical axis direction in a region of the quadrangular frame structure in which the second sub-frame is combined with the connection-type molded portion.

The lens holder may be disposed on the support frame, and an image stabilization magnet may be disposed on a portion of an external side of the lens holder corresponding to a space between an end portion of the connection-type molded portion and the island-type molded portion.

A lower end of the image stabilization magnet may be disposed lower than an upper end of a bottom of the connection-type molded portion.

The housing may include a damper disposed on an internal bottom surface of the housing and protruding upward in the optical axis direction toward an external bottom surface of the carrier.

The damper may include an elastic member.

In another general aspect, a lens driving device includes a carrier; and an image stabilization unit including a lens holder configured to hold a lens barrel, and a support frame having a quadrangular frame structure including four corner regions and supporting the lens holder, the support frame and the lens holder being disposed in the carrier, the image stabilization unit being configured to move the lens holder relative to the carrier in a direction perpendicular to an optical axis direction of the lens holder, wherein the support frame includes a first sub-frame including two molded portions separated from each other and not connected to any other portion of the first sub-frame; and a second sub-frame made of a material having a higher strength than a material of which the first sub-frame is made, the second sub-frame connecting the four corner regions of the quadrangular frame structure and being combined with the two molded portions of the first sub-frame, and the lens holder includes an image stabilization magnet mounting surface corresponding to a space between the two molded portions of the first sub-frame.

The lens holder may further include another image stabilization magnet mounting surface corresponding to another space between the two molded portions of the first sub-frame.

The image stabilization mounting surface and the other image stabilization magnet mounting surface may be perpendicular to each other and parallel to the optical axis direction.

One of the two molded portions of the first sub-frame may be a connection-type molded portion connecting three corner regions of the quadrangular frame structure, and another one of the two molded portions of the first sub-frame may be an island-type molded portion separated from the connection-type molded portion and disposed in a fourth corner region of the quadrangular frame structure.

The second sub-frame may further include a bent post that is bent from the second sub-frame in the optical axis direction in the fourth corner region of the quadrangular frame structure and embedded in the island-type molded portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
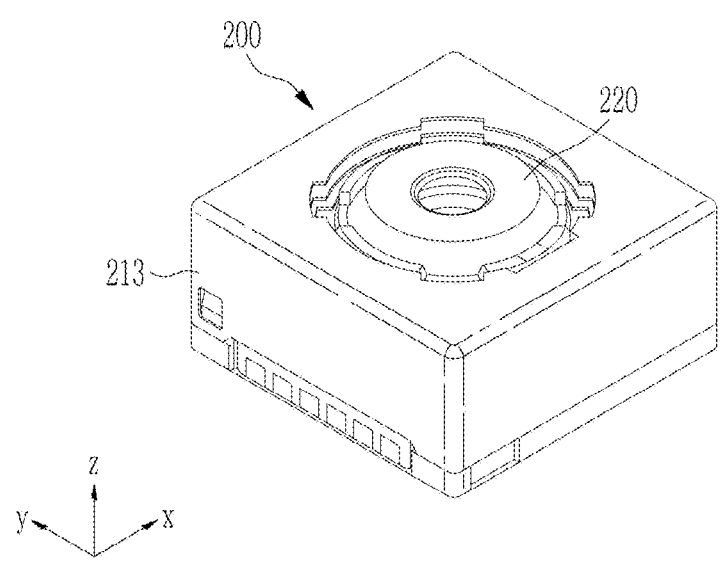
FIG. 1 shows a perspective view of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The phrase "in a plan view" or "on a plane" means viewing a target portion from the top, and the phrase "in a cross-sectional view" or "on a cross-section" means viewing a cross-section formed by perpendicularly cutting a target portion from the side.

Figure 2:
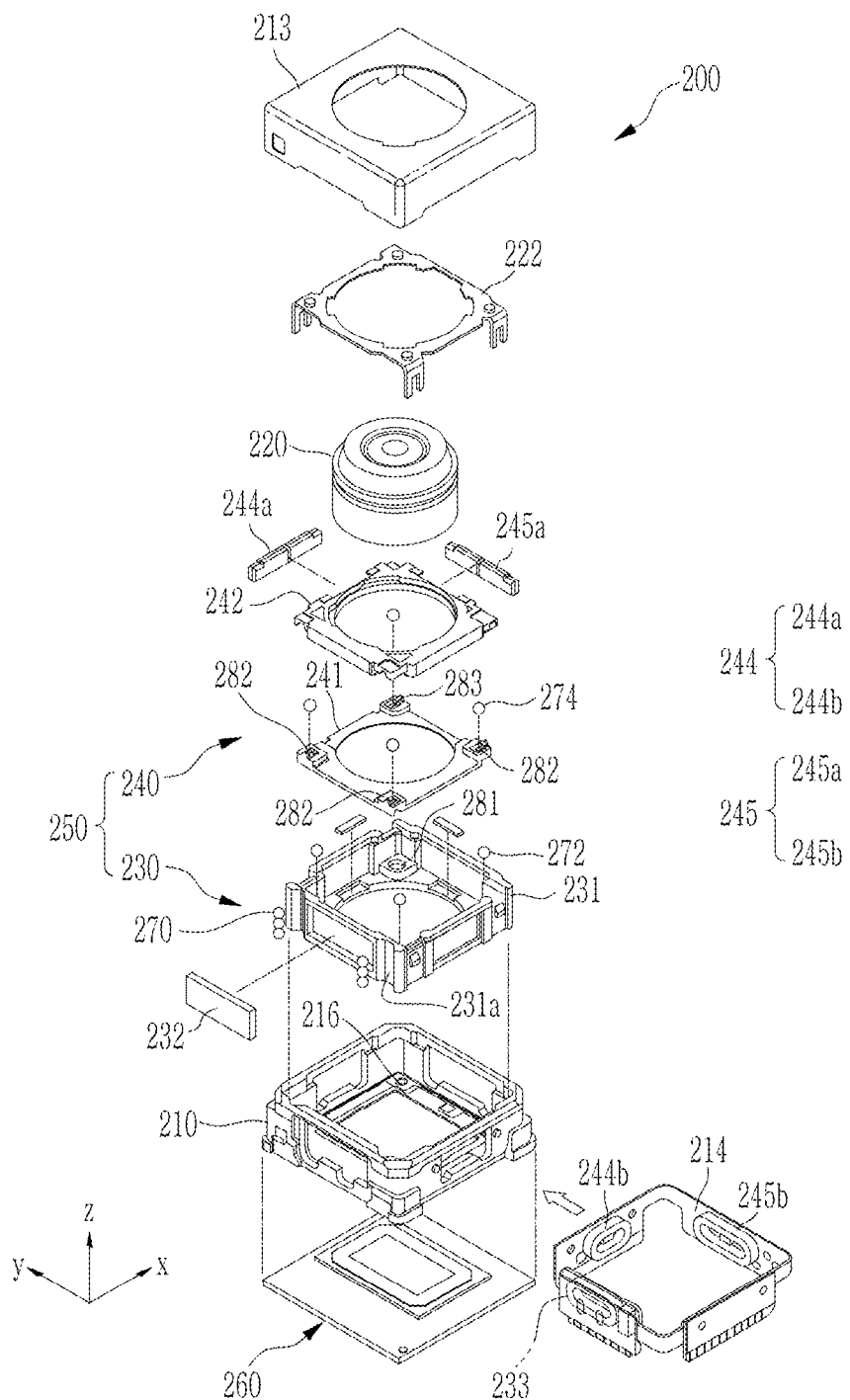
FIG. 2 shows an exploded perspective view of the camera module shown in FIG. 1.

FIG. 1 shows a perspective view of a camera module according to an embodiment, and FIG. 2 shows an exploded perspective view of the camera module shown in FIG. 1.

Referring to FIGS. 1 and 2, a camera module 200 according to the present embodiment includes a lens barrel 220, a lens driving device 250 for moving the lens barrel 220, an image sensor unit 260 for converting light input through the lens barrel 220 into electric signals, and a housing 210 for accommodating the lens barrel 220 and the lens driving device 250, and a cover 213.

The lens barrel 220 may have a hollow space in a cylindrical shape for receiving a plurality of lenses for photographing a subject into the lens barrel 220, and the lenses are mounted in the lens barrel 220 along an optical axis. A required number of lenses may be disposed according to a design of the lens barrel 220, and the respective lenses may have optical characteristics such as identical or different refractive indexes. The optical axis may be set to be a z-axis in the drawing.

The lens driving device 250 moves the lens barrel 220, and includes a focus unit 230 for adjusting a focus of the camera module 200 and an image stabilization unit 240 for correcting hand trembling or shaking of the camera module 200.

For example, the lens driving device 250 may use the focus unit 230 to move the lens barrel 220 in an optical axis direction (i.e., the z-axis direction in the drawing) to control the focus, and it may use the image stabilization unit 240 to move the lens barrel 220 in a direction (i.e., an x-axis or y-axis direction in the drawing) that is perpendicular to the optical axis direction to correct the hand trembling or shaking at the time of photographing.

The focus unit 230 includes a carrier 231 for accommodating the lens barrel 220 and a focus driver for generating a driving force for moving the lens barrel 220 and the carrier 231 in the optical axis direction. The focus driver includes a focus magnet 232 and a focus coil 233.

When a power voltage is applied to the focus coil 233, the carrier 231 may be moved in the optical axis direction by an electromagnetic force between the focus magnet 232 and the focus coil 233. Since the lens barrel 220 is disposed in the carrier 231, the lens barrel 220 may also move in the optical axis direction with the carrier 231, and the focus may be adjusted.

For example, the focus magnet 232 may be installed on one side of the carrier 231, and the focus coil 233 may be installed on the housing 210 via a substrate 214. In this example, the focus magnet 232 is a moving member that is mounted on the carrier 231 and moves in the optical axis direction together with the carrier 231, and the focus coil 233 is a stationary member that is fixed to the housing 210. However, this is only an example, and positions of the focus magnet 232 and the focus coil 233 may be exchanged with each other.

Rolling members 270 may be disposed between the carrier 231 and the housing 210 to reduce friction between the carrier 231 and the housing 210 when the carrier 231 moves. The rolling members 270 may have a ball shape, and may be disposed on opposite sides of one side of the carrier 231. Guide grooves 231a may be formed in the carrier 231 so that the rolling member 270 may be received therein and may be guided in the optical axis direction.

The image stabilization unit 240 corrects blurring of images or shaking of videos by factors such as vibration of a hand of a user when the images or the videos are photographed. That is, when the images are shaken while they are photographed by the hand shaking of the user, the image stabilization unit 240 compensates the shaking by providing a relative displacement that corresponds to the shaking to the lens barrel 220. For example, the image stabilization unit 240 corrects the shaking by moving the lens barrel 220 in the x-axis and y-axis directions that are perpendicular to the optical axis direction.

The image stabilization unit 240 includes a guide assembly for guiding the movement of the lens barrel 220, and an image stabilization driver for generating a driving force for moving the guide assembly in a direction that is perpendicular to the optical axis direction.

The guide assembly includes a support frame 241 and a lens holder 242. The support frame 241 and the lens holder 242 are inserted into the carrier 231 and are disposed in the optical axis direction, and guide the movement of the lens barrel 220.

The support frame 241 and the lens holder 242 provide a space into which the lens barrel 220 may be inserted, and the lens barrel 220 is fixed to the lens holder 242. The lens holder 242 may have a quadrangular cast shape, and the support frame 241 may have a quadrangular frame structure corresponding to the quadrangular frame shape of the lens holder 242. Image stabilization magnets 244a and 245a may be provided on two external sides of the lens holder 242 that are adjacent to each other and orthogonal to each other.

The image stabilization driver includes a first image stabilization driver 244 and a second image stabilization driver 245, and the first and second image stabilization drivers 244 and 245 include the image stabilization magnets 244a and 245a and image stabilization coils 244b and 245b.

The first image stabilization driver 244 generates a driving force in the first axis direction (the x-axis direction) that is perpendicular to the optical axis direction, and the second image stabilization driver 245 generates a driving force in the second axis direction (the y-axis direction) that is perpendicular to the optical axis direction and the first axis direction. The second axis (the y-axis) is perpendicular to the optical axis (the z-axis) and the first axis (the x-axis). The first image stabilization driver 244 and the second image stabilization driver 245 may be orthogonal to each other in a plane that is perpendicular to the optical axis.

The image stabilization magnets 244a and 245a of the first and second image stabilization drivers 244 and 245 are mounted on the lens holder 242, and the image stabilization coils 244b and 245b respectively facing the image stabilization magnets 244a and 245a are mounted on the housing 210 via the substrate 214. In another example, the image stabilization coils 244b and 245b may be installed to face the image stabilization magnets 244a and 245a by using another structure that is not the substrate 214 and the housing 210.

The image stabilization magnets 244a and 245a are moving members that move in a direction that is perpendicular to the optical axis direction together with the lens holder 242, and the image stabilization coils 244b and 245b are stationary members that are fixed to the housing 210. However, this is only an example, and the positions of the image stabilization magnets 244a and 245a and the image stabilization coils 244b and 245b may be exchanged with each other.

The present embodiment provides a plurality of ball members for supporting the image stabilization unit 240. The ball members facilitate movement of the support frame 241 and the lens holder 242 in the image stabilization process. The ball members maintain gaps among the carrier 231, the support frame 241, and the lens holder 242.

The ball members include first ball members 272 and second ball members 274. The first ball members 272 facilitate movement of the image stabilization unit 240 in the second axis direction (the y-axis direction), and the second ball members 274 facilitate movement of the image stabilization unit 240 in the first axis direction (the x-axis direction). The first ball members 272 include a plurality of ball members disposed between the carrier 231 and the support frame 241, and the second ball members 274 include a plurality of ball members disposed between the support frame 241 and the lens holder 242.

A first guide groove portion 281 for receiving the first ball members 272 is formed on a side of the carrier 231 facing the support frame 241 in the optical axis direction. The first guide groove portion 281 includes a plurality of guide grooves.

The first ball members 272 are disposed in the first guide groove portion 281 so that the first ball members 272 are disposed between the carrier 231 and the support frame 241. While they are disposed in the first guide groove portion 281, the first ball members 272 may not move in the optical axis direction and the first axis direction (the x-axis direction), and may move only in the second axis direction (the y-axis direction).

Second guide groove portions 282 and 283 for receiving the second ball members 274 are formed on a side of the support frame 241 facing the lens holder 242 in the optical axis direction. There are three second guide groove portions 282 and one second guide groove portion 283.

The second ball members 274 are disposed in the second guide groove portions 282 and 283 so that the second ball members 274 are disposed between the support frame 241 and the lens holder 242. While they are disposed in the second guide groove portions 282 and 283, the second ball members 274 may not move in the optical axis direction and the second axis direction (the y-axis direction), and may move only in the first axis direction (the x-axis direction). For this purpose, the guide grooves of the second guide groove portions 282 and 283 in a plan view in the optical axis direction may have a rectangular shape in which a length in the second axis direction is greater than a width of the first axis direction.

The image sensor unit 260 converts light input through the lens barrel 220 into electrical signals. For example, the image sensor unit 260 may include an image sensor and a flexible printed circuit (FPC) on which the image sensor is mounted, and may further include an infrared ray filter. The infrared ray filter blocks light of an infrared ray region in the light input through the lens barrel 220.

The lens barrel 220 and the lens driving device 250 are disposed in an internal space of the housing 210. For example, the housing 210 may have a box shape having openings in the top and bottom. The image sensor unit 260 is mounted on the bottom of the housing 210. The housing 210 includes a damper 216 shown in FIG. 2 that is described below in connection with FIGS. 7 and 8.

A stopper 222 is disposed over the lens barrel 220 and fastened to the carrier 231 to hold the lens barrel 220, the lens holder 242, the first ball members 272, the support frame 241, and the second ball members 274 in place.

The cover 213 is fastened to the housing 210 to surround the housing 210 and protect internal components of the camera module 200. The cover 213 may shield electromagnetic waves generated by the camera module 200. For example, the cover 213 may shield the electromagnetic waves generated by the camera module 200 so that they may not influence other electronic parts in the portable electronic device.

Figure 3:
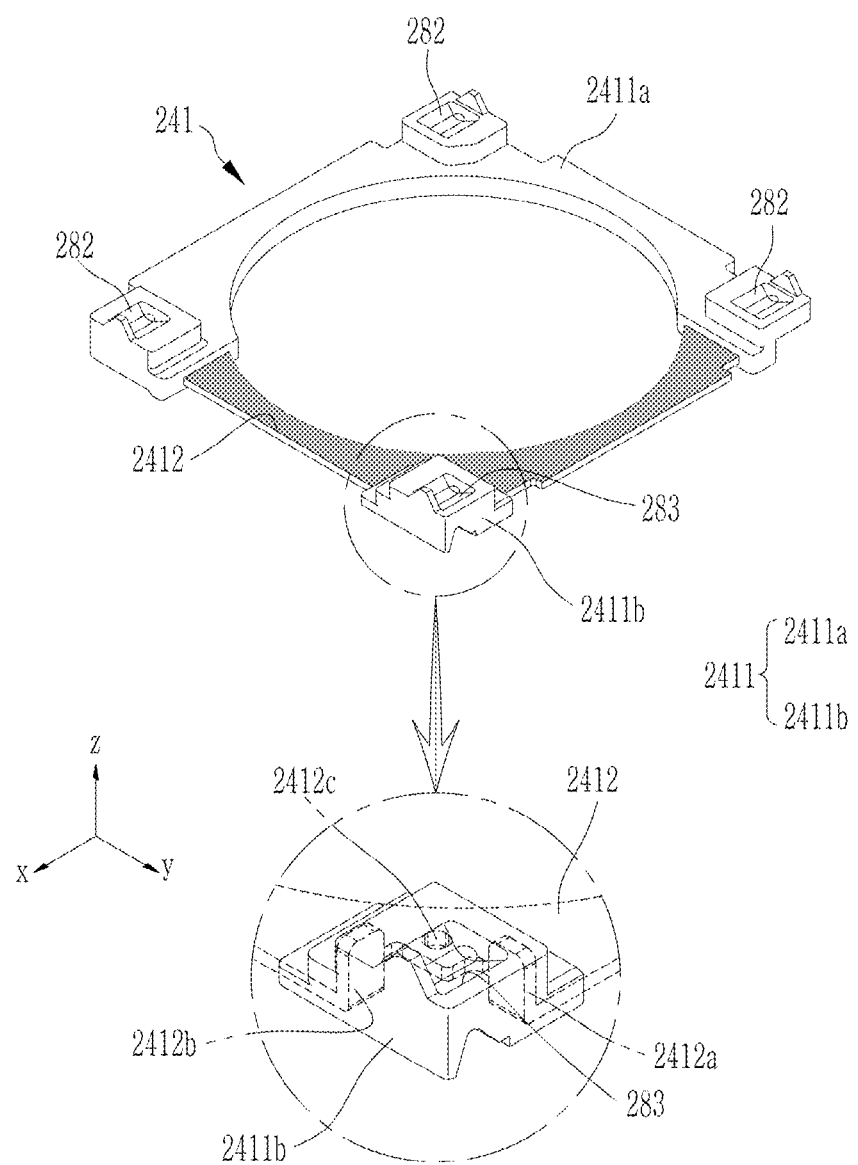
FIG. 3 and FIG. 4 show perspective views of examples of a support frame of the camera module shown in FIGS. 1 and 2.
Figure 4:
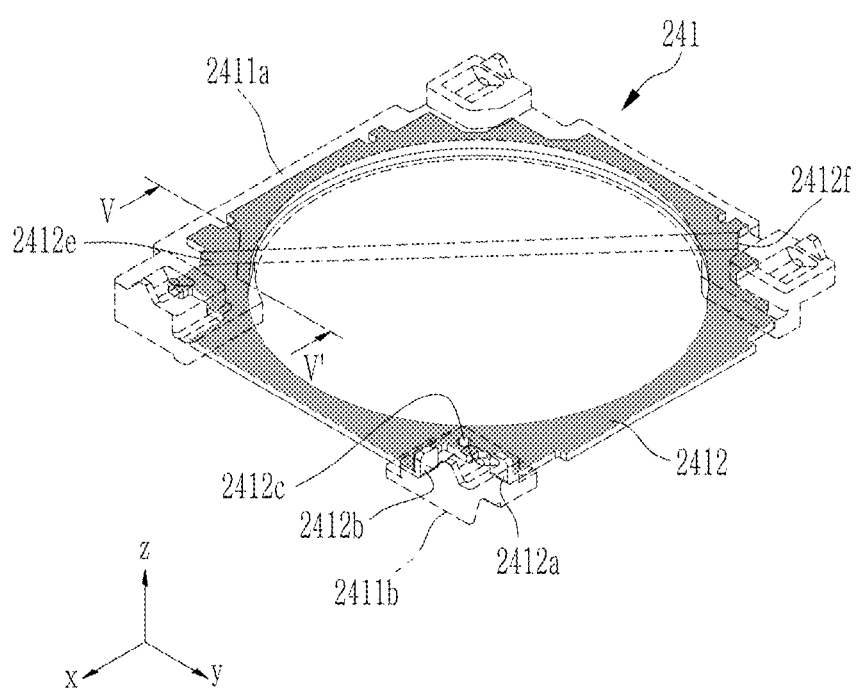
Figure 5:
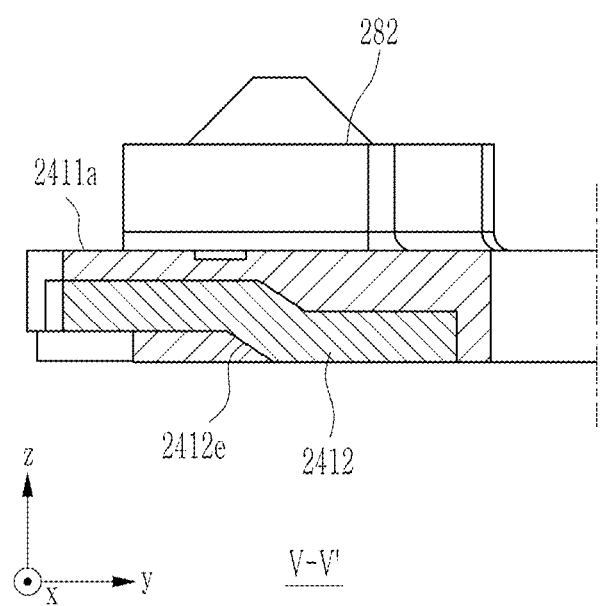
FIG. 5 shows a cross-sectional view of the support frame shown in FIG. 4 taken along the line V-V' in FIG. 4.

FIGS. 3 and 4 show perspective views of examples of a support frame of the camera module shown in FIGS. 1 and 2, and FIG. 5 shows a cross-sectional view of the support frame shown in FIG. 4 taken along the line V-V' in FIG. 4.

Referring to FIGS. 3 to 4, the support frame 241 according to the present embodiment has a quadrangular frame structure in which a circular hole is formed in a center of the quadrangular frame structure. The quadrangular frame structure includes four corner regions. As described above in connection with FIG. 2, the support frame 241 supports the lens holder 242 with the second ball members 274 disposed therebetween so that the movement in of the lens holder 242 is guided in the first axis direction (the x-axis direction) that is perpendicular to both the optical axis direction (i.e., the direction of the optical axis of the lens barrel 220) and the second axis direction (the y-axis direction).

The support frame 241 includes a first sub-frame 2411 including the three second guide groove portions 282 and the one second guide groove portion 283, and a second sub-frame 2412 made of a material having a higher strength than a material of which the first sub-frame 2411 is made. For example, the first sub-frame 2411 may be made of a resin material, and the second sub-frame 2412 may be made of a metal material. Therefore, the thickness of the second sub-frame 2412 in the optical axis direction may be smaller than the thickness of the first sub-frame 2411 in the optical axis direction. In one example, the thickness may be the minimum thickness of the thinnest portion of the respective components, and in another example, the thickness may be a mean thickness of the respective components.

The first sub-frame 2411 may include a connection-type molded portion 2411a connecting three corner regions of the quadrangular frame structure, and an island-type molded portion 2411b separated from the connection-type molded portion 2411a and disposed in a fourth corner region of the quadrangular frame structure. That is, the connection-type molded portion 2411a may have substantially an L shape including three of the four corner regions of the quadrangular frame structure, and the island-type molded portion 2411b may be disposed in the fourth corner region of the that quadrangular frame structure that is not connected by the connection-type molded portion 2411a.

Although FIG. 3 appears to show that the second sub-frame 2412 only connects three corner regions of the quadrangular frame structure, this is because part of the second sub-frame 2412 in FIG. 3 is hidden by the connection type molded member 2411a, and the second sub-frame 2412 in FIG. 3 actually connects all four corner regions of the quadrangular frame structure as shown in FIG. 4.

The three second guide groove portions 282 may be formed on the connection-type molded portion 2411a in the three corner regions of the quadrangular frame structure connected by the connection-type molded portion 2411a, and the one second guide groove portion 283 may be formed on the island-type molded portion 2411b in the fourth corner region of the quadrangular frame structure. The second guide groove portions 282 and 283 may receive the second ball members 274 as described above, and may guide the lens holder 242 to move in the first axis direction (the x-axis direction) with respect to the support frame 241. Therefore, the three second guide groove portions 282 of the connection-type molded portion 2411a and the one second guide groove portion 283 of the island-type molded portion 2411b may extend in the same direction, that is, in the first axis direction.

The second sub-frame 2412 may connect the four regions of the quadrangular frame structure and may be combined with the connection-type molded portion 2411a and the island-type molded portion 2411b. The second sub-frame 2412 may have a circular internal edge, and the connection-type molded portion 2411a may have a round internal side along the internal edge of the second sub-frame 2412.

The first sub-frame 2411 made of a resin material may be formed on the second sub-frame 2412 made of a metal material by an insert molding process. Therefore, as shown in FIGS. 3 and 4, part of the second sub-frame 2412 may be embedded in the first sub-frame 2411, and part of the second sub-frame 2412 may be exposed outside the first sub-frame 2411.

The second sub-frame 2412 includes bent posts 2412a and 2412b that are bent from the second sub-frame 2412 in the optical axis direction in a corner region combined to the island-type molded portion 2411b. The bent posts 2412a and 2412b may be embedded in the island-type molded portion 2411b by the insert molding process, and may face in directions that are orthogonal to each other. For example, the bent post 2412a may face in the first axis direction (the x-axis direction), and the bent post 2412b may face in the second axis direction (the y-axis direction) perpendicular to, i.e., orthogonal to, the first axis direction (the x-axis direction). The bent posts 2412a and 2412b may be bent upward from the second sub-frame 2412 in the optical axis direction, and may be completely embedded in the island-type molded portion 2411b.

The second sub-frame 2412 may include a combining hole 2412c extending in the optical axis direction in the fourth corner region of the quadrangular frame structure and filled with a resin material of the island-type molded portion 2411b. When the second sub-frame 2412 and the island-type molded portion 2411b are manufactured by the insert molding process, the resin material flows into and fills the combining hole 2412c, which may increase bonding strength between the island-type molded portion 2411b and the second sub-frame 2412.

Referring to FIGS. 4 and 5, the second sub-frame 2412 may include step portions 2412e and 2412f formed by bending the second sub-frame 2412 to form two steps in the second sub-frame 2412 to lower a portion of the second sub-frame 2412 in the optical axis direction in the region of the quadrangular frame structure in which the second sub-frame 2412 is combined with the connection-type molded portion 2411a. The step portions 2412e and 2412f may be configured so that the two steps may be parallel to each other in a diagonal direction of the second sub-frame 2412 as indicated by the dashed lines in FIG. 4.

That is, when the step portions 2412e and 2412f disposed in the region of the quadrangular frame structure in which the second sub-frame 2412 is combined with the connection-type molded portion 2411a, the step portions 2412e and 2412f may be disposed on opposite sides of the second sub-frame 2412. The two steps of the step portions 2412e and 2412f may be parallel to each other in the diagonal direction of the second sub-frame 2412 as indicated by the dashed lines in FIG. 4.

The step portions 2412e and 2412f formed in the second sub-frame 2412 may increase the bonding strength between the connection-type molded portion 2411a and the second sub-frame 2412 by causing part of the second sub-frame 2412 made of a metal material to be completely embedded in the connection-type molded portion 2411a made of a resin material when the support frame 241 is manufactured by the insert molding process.

Figure 6:
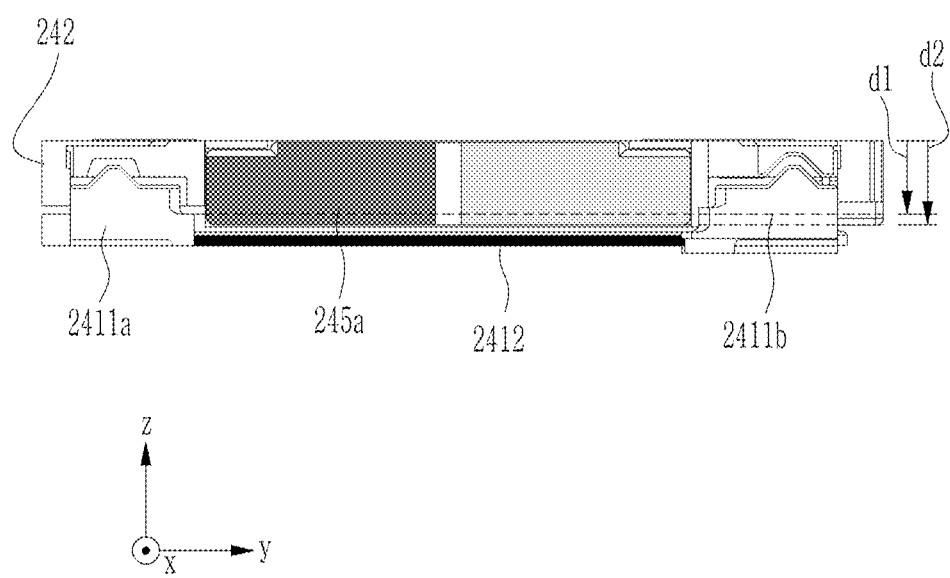
FIG. 6 shows a lateral side view of an assembled state of the support frame and a lens holder of the camera module shown in FIGS. 1 and 2.

FIG. 6 shows a lateral side view of an assembled state of the support frame and a lens holder of the camera module shown in FIGS. 1 and 2.

Referring to FIG. 6, the image stabilization magnet 245a shown in FIG. 2 is disposed on the lens holder 242 of the camera module 200 according to the present embodiment, and the lens holder 242 may be mounted on an upper surface of the support frame 241 in the optical axis direction. The image stabilization magnet 245a may be disposed on the lens holder 242 between an end portion of the connection-type molded portion 2411a of the support frame 241 and the island-type molded portion 2411b. That is, the image stabilization magnet 245a may be disposed on a portion of an external side of the lens holder 242 corresponding to a space between the end portion of the connection-type molded portion 2411a and the island-type molded portion 2411b.

The light portion of the image stabilization magnet 245a in FIG. 6 may be a north pole of the image stabilization magnet 245a, and the dark portion of the image stabilization magnet 245a in FIG. 6 may be a south pole of the image stabilization magnet 245a. Alternatively, the light portion may be a south pole, and the dark portion may be a north pole.

When the image stabilization magnet 245a is mounted on the support frame 241, a lower end of the image stabilization magnet 245a may be disposed lower than an upper end of a bottom of the connection-type molded portion 2411a. As shown in FIG. 6, regarding a depth measured downward from the top end of the image stabilization magnet 245a, a depth d2 to the lower end of the image stabilization magnet 245a may be greater than a depth d1 to the upper end of the bottom of the connection-type molded portion 2411a.

That is, the first sub-frame 2411 of the support frame 241 has no molded portion formed in the portion of the quadrangular frame structure where the image stabilization magnet 245a is disposed so that the lower end of the image stabilization magnet 245a may be disposed lower than the upper end of the bottom of the connection-type molded portion 2411a. Therefore, even when the height of the lens driving device 250 is reduced, the height of the image stabilization magnet 245a in the optical axis direction may not be reduced or may be increased so that the image stabilization driving force may not be reduced or may be increased.

FIG. 6 does not show a positional relationship between the image stabilization magnet 244a shown in FIG. 2, the end of the connection-type molded portion 2411a, and the island-type molded portion 2411b. However, the image stabilization magnet 244a may be disposed in the same way the image stabilization magnet 245a is disposed as shown in FIG. 6.

Figure 7:
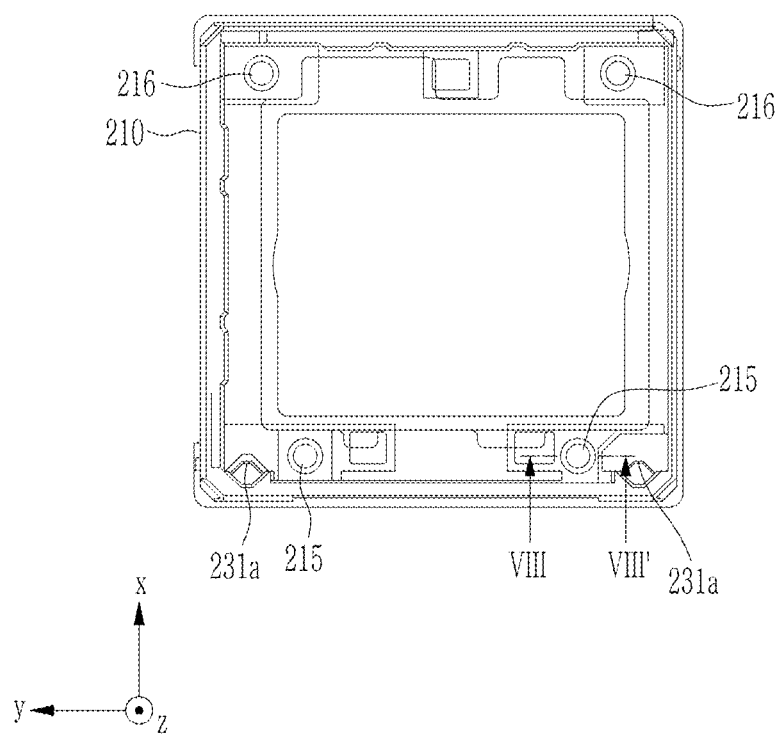
FIG. 7 shows a top plan view of a housing of the camera module shown in FIGS. 1 and 2.
Figure 8:
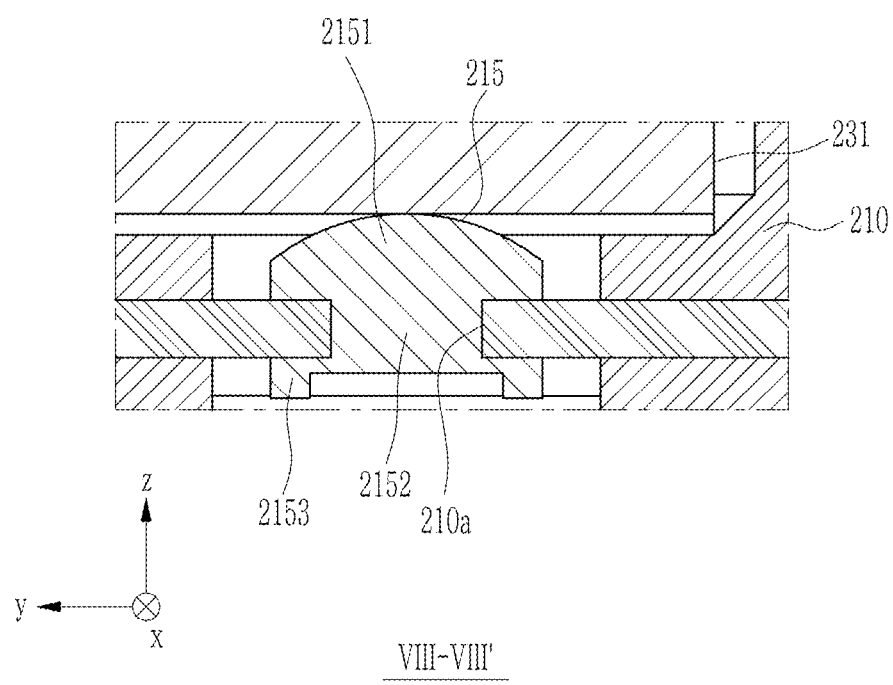
FIG. 8 shows a cross-sectional view of the housing shown in FIG. 7 taken along the line VIII-VIII' in FIG. 7.

FIG. 7 shows a top plan view of a housing of the camera module shown in FIGS. 1 and 2, and FIG. 8 shows a cross-sectional view of the housing shown in FIG. 7 taken along the line VIII-VIII' in FIG. 7.

Referring to FIG. 7, the housing 210 of the camera module 200 according to the present embodiment may have a quadrangular shape having four corner regions when viewed in the optical axis direction (the z-axis direction). The housing 210 may include two dampers 215 and two dampers 216 that protrude upward from an internal bottom surface of the housing 210. The two dampers 216 may be disposed in two corner regions of the housing 210 in which the guide grooves 231a are not formed. The guide grooves 231a in which the rolling members 270 are disposed are formed in the other two corner regions of the housing 210. Accordingly, to avoid interference with the guide grooves 231a, the two dampers 215 may be disposed at positions that are offset from the other two corner regions of the housing in the second axis direction (the y-axis direction) toward a center of the housing 210.

Referring to FIG. 8, the dampers 215 include a round head portion 2151, a neck portion 2152 having a diameter that is smaller than a diameter of the round head portion 2151, and a leg portion 2153 having a diameter that is larger than the diameter of the neck portion 2152. The head portion 2151 may protrude from the internal bottom surface of the housing 210, the neck portion may be inserted in a through-hole 210a of the housing 210, and the leg portion 2153 may be disposed on the external bottom surface of the housing 210. The structure of the dampers 216 is the same as the structure of the dampers 215. The dampers 215 and 216 may be made of an elastic resin material, and may be integrally combined with the housing 210 during the insert molding process.

As described above with reference to FIG. 2, the carrier 231 in which the support frame 241, the lens holder 242, and the lens barrel 220 are disposed is driven in the optical axis direction by the focus unit 230 in the internal space of the housing 210, and an external bottom surface of the carrier 231 may face the internal bottom surface of the housing 210. Accordingly, the dampers 215 and 216 may function as buffers for absorbing impacts when the external bottom surface of the carrier 231 collides with the dampers 215 and 216.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens driving device comprising:
 a carrier; and
 an image stabilization unit comprising a lens holder configured to hold a lens barrel, and a support frame having a quadrangular frame structure comprising four corner regions and supporting the lens holder, the support frame and the lens holder being disposed in the carrier, the image stabilization unit being configured to move the lens holder relative to the carrier in a direction perpendicular to an optical axis direction of the lens holder,
 wherein the support frame comprises:
  a first sub-frame comprising a connection-type molded portion connecting three corner regions of the quadrangular frame structure, and an island-type molded portion separated from the connection-type molded portion and disposed in a fourth corner region of the quadrangular frame structure; and
  a second sub-frame made of a material having a higher strength than a material of which the first sub-frame is made, the second sub-frame connecting the four corner regions of the quadrangular frame structure and being combined with the connection-type molded portion and the island-type molded portion.

2. The lens driving device of claim 1, wherein the first sub-frame is made of a resin material, and the second sub-frame is made of a metal material.

3. The lens driving device of claim 1, wherein a minimum thickness of the second sub-frame in the optical axis direction is smaller than a minimum thickness of the first sub-frame in the optical axis direction.

4. The lens driving device of claim 1, wherein the connection-type molded portion comprises guide grooves in the three corner regions of the quadrangular frame structure, and
 the island-type molded portion comprises guide grooves in the fourth corner region of the quadrangular frame structure.

5. The lens driving device of claim 4, wherein the guide grooves of the connection-type molded portion and the guide grooves of the island-type molded portion extend in a same direction.

6. The lens driving device of claim 1, wherein the second sub-frame further comprises a bent post that is bent from the second sub-frame in the optical axis direction in the fourth corner region of the quadrangular frame structure and embedded in the island-type molded portion.

7. The lens driving device of claim 6, wherein the bent post comprises two bent posts facing in two directions that are orthogonal to each other.

8. The lens driving device of claim 1, wherein the second sub-frame comprises a combining hole extending in the optical axis direction in the fourth corner region of the quadrangular frame structure and filled by a material of the island-type molded portion.

9. The lens driving device of claim 1, wherein the second sub-frame comprises a step portion formed by bending the second sub-frame to lower a portion of the second sub-frame in the optical axis direction in a region of the quadrangular frame structure in which the second sub-frame is combined with the connection-type portion.

10. The lens driving device of claim 9, wherein the step portion comprises two steps in the second sub-frame that are disposed parallel to each other in a diagonal direction of the second sub-frame.

11. The lens driving device of claim 1, wherein the lens holder is disposed on the support frame, and
an image stabilization magnet is disposed on a portion of an external side of the lens holder corresponding to a space between an end portion of the connection-type molded portion and the island-type molded portion.

12. The lens driving device of claim 11, wherein a lower end of the image stabilization magnet is disposed lower than an upper end of a bottom of the connection-type molded portion.

13. A camera module comprising:
a housing;
a lens barrel in which at least one lens is disposed;
a carrier disposed in the housing;
a focus unit configured to move the carrier relative to the housing in an optical axis direction of the at least one lens; and
an image stabilization unit comprising a lens holder in which the lens barrel is disposed, and a support frame having a quadrangular frame structure comprising four corner regions and supporting the lens holder, the support frame, the lens holder, and the lens barrel being disposed in the carrier, the image stabilization unit being configured to move the lens holder and the lens barrel relative to the carrier in a direction perpendicular to the optical axis direction,
wherein the support frame comprises:
a first sub-frame comprising a connection-type molded portion connecting three corner regions of the quadrangular frame structure, and an island-type molded portion separated from the connection-type molded portion and disposed in a fourth corner region of the quadrangular frame structure; and
a second sub-frame made of a material having a higher strength than a material of which the first sub-frame is made, the second sub-frame connecting the four corner regions of the quadrangular frame structure, and being combined with the connection-type molded portion and the island-type molded portion.

14. The camera module of claim 13, wherein the first sub-frame is made of a resin material, and the second sub-frame is made of a metal material.

15. The camera module of claim 13, wherein the second sub-frame comprises a bent post that is bent from the second sub-frame in the optical axis direction in the fourth corner region of the quadrangular frame structure and is embedded in the island-type molded portion.

16. The camera module of claim 13, wherein the second sub-frame comprises a step portion formed by bending the second sub-frame to lower a portion of the second sub-frame in the optical axis direction in a region of the quadrangular frame structure in which the second sub-frame is combined with the connection-type molded portion.

17. The camera module of claim 13, wherein the lens holder is disposed on the support frame, and
an image stabilization magnet is disposed on a portion of an external side of the lens holder corresponding to a space between an end portion of the connection-type molded portion and the island-type molded portion.

18. The camera module of claim 17, wherein a lower end of the image stabilization magnet is disposed lower than an upper end of a bottom of the connection-type molded portion.

19. The camera module of claim 13, wherein the housing comprises a damper disposed on an internal bottom surface of the housing and protruding upward in the optical axis direction toward an external bottom surface of the carrier.

20. The camera module of claim 19, wherein the damper comprises an elastic member.

21. A lens driving device comprising:
a carrier; and
an image stabilization unit comprising a lens holder configured to hold a lens barrel, and a support frame having a quadrangular frame structure comprising four corner regions and supporting the lens holder, the support frame and the lens holder being disposed in the carrier, the image stabilization unit being configured to move the lens holder relative to the carrier in a direction perpendicular to an optical axis direction of the lens holder,
wherein the support frame comprises:
a first sub-frame comprising two molded portions separated from each other and not connected to any other portion of the first sub-frame; and
a second sub-frame made of a material having a higher strength than a material of which the first sub-frame is made, the second sub-frame connecting the four corner regions of the quadrangular frame structure and being combined with the two molded portions of the first sub-frame, and
the lens holder comprises an image stabilization magnet mounting surface corresponding to a space between the two molded portions of the first sub-frame.

22. The lens driving device of claim 21, wherein the lens holder further comprises another image stabilization magnet mounting surface corresponding to another space between the two molded portions of the first sub-frame.

23. The lens driving device of claim 22, wherein the image stabilization mounting surface and the other image stabilization magnet mounting surface are perpendicular to each other and parallel to the optical axis direction.

24. The lens driving device of claim 21, wherein one of the two molded portions of the first sub-frame is a connection-type molded portion connecting three corner regions of the quadrangular frame structure, and another one of the two molded portions of the first sub-frame is an island-type molded portion separated from the connection-type molded portion and disposed in a fourth corner region of the quadrangular frame structure.

25. The lens driving device of claim 24, wherein the second sub-frame further comprises a bent post that is bent from the second sub-frame in the optical axis direction in the fourth corner region of the quadrangular frame structure and embedded in the island-type molded portion.

* * * * *